US008542802B2

(12) United States Patent
Olligschlaeger

(10) Patent No.: US 8,542,802 B2
(45) Date of Patent: Sep. 24, 2013

(54) SYSTEM AND METHOD FOR THREE-WAY CALL DETECTION

(75) Inventor: Andreas M. Olligschlaeger, Baden, PA (US)

(73) Assignee: **Global Tel*Link Corporation**, Mobile, AL (US)

( * ) Notice: Subject to any disclaimer, the term of this patent is extended or adjusted under 35 U.S.C. 154(b) by 1495 days.

(21) Appl. No.: 11/706,431

(22) Filed: Feb. 15, 2007

(65) Prior Publication Data

US 2008/0198978 A1    Aug. 21, 2008

(51) Int. Cl.
*H04M 1/64* (2006.01)
*G10L 17/00* (2006.01)

(52) U.S. Cl.
USPC ........................ 379/88.01; 704/246

(58) Field of Classification Search
USPC .................. 379/168, 189; 704/246, 252
See application file for complete search history.

(56) References Cited

U.S. PATENT DOCUMENTS

| | | | |
|---|---|---|---|
| 4,670,628 A | 6/1987 | Boratgis et al. |
| 4,691,347 A | 9/1987 | Stanley et al. |
| 4,813,070 A | 3/1989 | Humphreys et al. |
| 4,907,221 A | 3/1990 | Pariani et al. |
| 4,918,719 A | 4/1990 | Daudelin |
| 4,943,973 A | 7/1990 | Werner |
| 4,995,030 A | 2/1991 | Helf |
| 5,291,548 A | 3/1994 | Tsumura et al. |
| 5,319,702 A | 6/1994 | Kitchin et al. |
| 5,319,735 A | 6/1994 | Preuss et al. |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,502,762 A | 3/1996 | Andrew et al. |
| 5,535,194 A | 7/1996 | Ashley et al. |
| 5,535,261 A | 7/1996 | Brown et al. |

(Continued)

FOREIGN PATENT DOCUMENTS

| | | |
|---|---|---|
| GB | 2 075 313 | 11/1981 |
| JP | 59225626 | 12/1984 |

(Continued)

OTHER PUBLICATIONS

National Alliance of Gang Investigators Associations, 2005 National Gang Threat Assessment, 2005, pp. vi and 5-7, Bureau of Justice Assistance, Office of Justice Programs, U.S. Department of Justice.

(Continued)

*Primary Examiner* — Mohammad Islam
(74) *Attorney, Agent, or Firm* — Sterne, Kessler, Goldstein & Fox PLLC

(57) ABSTRACT

A system for detecting three-way calls in a monitored telephone conversation includes a speech recognition processor that transcribes the monitored telephone conversation and associates characteristics of the monitored telephone conversation with a transcript thereof, a database to store the transcript and the characteristics associated therewith, and a three-way call detection processor to analyze the characteristics of the conversation and to detect therefrom the addition of one or more parties to the conversation. The system preferably includes at least one domain-specific language model that the speech recognition processor utilizes to transcribe the conversation. The system may operate in real-time or on previously recorded conversations. A query and retrieval system may be used to retrieve and review call records from the database.

27 Claims, 5 Drawing Sheets

(56) References Cited

U.S. PATENT DOCUMENTS

| | | |
|---|---|---|
| 5,539,731 A | 7/1996 | Haneda et al. |
| 5,539,812 A | 7/1996 | Kitchin et al. |
| 5,555,551 A | 9/1996 | Rudokas et al. |
| 5,583,925 A | 12/1996 | Bernstein |
| 5,590,171 A | 12/1996 | Howe |
| 5,592,548 A | 1/1997 | Sih |
| 5,613,004 A | 3/1997 | Cooperman |
| 5,619,561 A | 4/1997 | Reese |
| 5,634,086 A | 5/1997 | Rtischev et al. |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici |
| 5,768,426 A | 6/1998 | Rhoads |
| 5,774,452 A | 6/1998 | Wolosewicz |
| 5,796,811 A | 8/1998 | McFarlen |
| 5,805,685 A | 9/1998 | McFarlen |
| 5,822,432 A | 10/1998 | Moskowitz |
| 5,822,436 A | 10/1998 | Rhoads |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,862,260 A | 1/1999 | Rhoads |
| 5,867,562 A | 2/1999 | Scherer |
| 5,883,945 A | 3/1999 | Richardson et al. |
| 5,889,568 A | 3/1999 | Seraphim et al. |
| 5,899,972 A | 5/1999 | Miyazawa et al. |
| 5,907,602 A | 5/1999 | Peel et al. |
| 5,920,834 A | 7/1999 | Sih et al. |
| 5,926,533 A | 7/1999 | Gainsboro |
| 5,930,369 A | 7/1999 | Cox et al. |
| 5,930,377 A | 7/1999 | Powell et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,052,462 A | 4/2000 | Lu |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,111,954 A | 8/2000 | Rhoads |
| 6,122,392 A | 9/2000 | Rhoads |
| 6,122,403 A | 9/2000 | Rhoads |
| 6,138,119 A | 10/2000 | Hall et al. |
| 6,141,406 A | 10/2000 | Johnson |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |
| 6,301,360 B1 | 10/2001 | Bocionek et al. |
| 6,312,911 B1 | 11/2001 | Bancroft |
| 6,314,192 B1 | 11/2001 | Chen et al. |
| 6,324,573 B1 | 11/2001 | Rhoads |
| 6,324,650 B1 | 11/2001 | Ogilvie |
| 6,330,335 B1 | 12/2001 | Rhoads |
| 6,343,138 B1 | 1/2002 | Rhoads |
| 6,343,738 B1 | 2/2002 | Ogilvie |
| 6,389,293 B1 | 5/2002 | Clore et al. |
| 6,526,380 B1 | 2/2003 | Thelen et al. |
| 6,542,602 B1 | 4/2003 | Elazar |
| 6,633,846 B1 | 10/2003 | Bennett et al. |
| 6,647,096 B1 | 11/2003 | Milliorn et al. |
| 6,665,644 B1 | 12/2003 | Kanevsky et al. |
| 6,671,292 B1 | 12/2003 | Haartsen |
| 6,728,682 B2 | 4/2004 | Fasciano |
| 6,760,697 B1 | 7/2004 | Neumeyer et al. |
| 6,763,099 B1 * | 7/2004 | Blink ............................ 379/189 |
| 6,880,171 B1 | 4/2005 | Ahmad et al. |
| 6,895,086 B2 | 5/2005 | Martin |
| 6,907,387 B1 | 6/2005 | Reardon |
| 7,039,585 B2 | 5/2006 | Wilmot et al. |
| 7,050,918 B2 | 5/2006 | Pupalaikis et al. |
| 7,079,637 B1 | 7/2006 | McNitt et al. |
| 7,103,549 B2 | 9/2006 | Bennett et al. |
| 7,106,843 B1 | 9/2006 | Gainsboro et al. |
| 7,123,704 B2 | 10/2006 | Martin |
| 7,133,828 B2 | 11/2006 | Scarano et al. |
| 7,149,788 B1 | 12/2006 | Gundla et al. |
| 7,248,685 B2 | 7/2007 | Martin |
| 7,256,816 B2 | 8/2007 | Profanchik et al. |
| 7,277,468 B2 | 10/2007 | Tian et al. |
| 7,417,983 B2 | 8/2008 | He et al. |
| 7,519,169 B1 | 4/2009 | Hingoranee et al. |
| 7,529,357 B1 | 5/2009 | Rae et al. |
| 7,596,498 B2 | 9/2009 | Basu et al. |
| 7,639,791 B2 | 12/2009 | Hodge |
| 7,664,243 B2 | 2/2010 | Martin |
| 7,826,604 B2 | 11/2010 | Martin |
| 7,961,860 B1 | 6/2011 | McFarlen |
| 2001/0056461 A1 | 12/2001 | Kampe et al. |
| 2002/0002464 A1 | 1/2002 | Petrushin |
| 2002/0010587 A1 | 1/2002 | Pertrushin |
| 2002/0032566 A1 | 3/2002 | Tzirkel-Hancock et al. |
| 2003/0023444 A1 | 1/2003 | St. John |
| 2003/0040326 A1 | 2/2003 | Levy et al. |
| 2004/0252184 A1 | 12/2004 | Hesse et al. |
| 2005/0010411 A1 * | 1/2005 | Rigazio et al. ................. 704/246 |
| 2005/0080625 A1 | 4/2005 | Bennett et al. |
| 2005/0114192 A1 | 5/2005 | Tor et al. |
| 2005/0128283 A1 | 6/2005 | Bulriss et al. |
| 2005/0144065 A1 | 6/2005 | Bennett et al. |
| 2005/0182628 A1 * | 8/2005 | Choi ............................ 704/252 |
| 2006/0064037 A1 | 3/2006 | Shalon et al. |
| 2006/0087554 A1 | 4/2006 | Boyd et al. |
| 2006/0087555 A1 | 4/2006 | Boyd et al. |
| 2006/0200353 A1 | 9/2006 | Bennett |
| 2006/0285650 A1 | 12/2006 | Hodge |
| 2007/0071206 A1 * | 3/2007 | Gainsboro et al. ............ 379/168 |
| 2007/0185717 A1 | 8/2007 | Bennett |
| 2007/0237099 A1 | 10/2007 | He et al. |
| 2007/0244690 A1 | 10/2007 | Peters |
| 2008/0000966 A1 | 1/2008 | Keiser |
| 2008/0021708 A1 | 1/2008 | Bennett et al. |
| 2008/0106370 A1 | 5/2008 | Perez et al. |
| 2008/0118045 A1 | 5/2008 | Polozola et al. |
| 2008/0201143 A1 | 8/2008 | Olligschlaeger et al. |
| 2008/0201158 A1 | 8/2008 | Johnson et al. |
| 2008/0260133 A1 | 10/2008 | Hodge et al. |
| 2008/0300878 A1 | 12/2008 | Bennett |
| 2010/0177881 A1 | 7/2010 | Hodge |
| 2010/0202595 A1 | 8/2010 | Hodge et al. |

FOREIGN PATENT DOCUMENTS

| | | |
|---|---|---|
| JP | 60010821 | 1/1985 |
| JP | 61135239 | 6/1986 |
| JP | 3065826 | 3/1991 |
| WO | PCT/US9514230 | 11/1995 |

OTHER PUBLICATIONS

Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.

Michael G. Christel, Andreas M. Olligschlaeger, and Chang Huang, Interactive Maps for a Digital Video Library, IEEE Special Edition on Multimedia Computing, Jan.-Mar. 2000, pp. 60-67, IEEE, United States.

Ian R. Lane, Tatsuya Kawahara, and Tomoko Matsui, Language Model Switching Based on Topic Detection for Dialog Speech Recognition, Proceedings of the IEEE-ICASSP, vol. 1, pp. 616-619, 2003, IEEE, United States.

Andreas M. Olligschlaeger, Criminal Intelligence Databases and Applications, in Marilyn B. Peterson, Bob Morehouse, and Richard Wright, Intelligence 2000: Revising the Basic Elements—A Guide for Intelligence Professionals, 2000, a joint publication of IALEIA and LEIU, United States.

Office of the Inspector General, Department of Justice, Criminal Calls: A Review of the Bureau of Prisons' Management of Inmate Telephone Privileges, Chapter 4, 1999, United States.

National Major Gang Task Force, A Study of Gangs and Security Threat Groups in America's Adult Prisons and Jails, 2002, United States.

Audioconferencing options. (Teleconference Units, Conference Bridges and Sevice Bureaus) (includes related articles on speech processing and new conferencing technology), Frankel, Elana, Teleconnect v 14, n 5, p. 131(3). May 1996.

Digital on Call, Silberg, Lurie, HFN The Weekly Newspaper for the Home Furnishing Network, p. 97, Mar. 17, 1997.

Inmate Telephone Services: Large Business: Voice, Oct. 2, 2001.

Bender, W., et al., "Techniques For Data Hiding," *IBM Systems Journal*, vol. 35, Nos. 3&4, 1996.

Boney, L., et al., "Digital Watermarks for Audio Signals" *Proceedings of the International Conference on Multimedia Computing Systems*, p. 473-480, IEEE Computer Society Press, United States (1996).

Boney, L., et al., "Digital Watermarks for Audio Signals" *Proceedings of EUSIPC0-96, Eighth European Signal processing Conference*, Trieste, Italy, 10-13 (1996).

Cox, I. J., et al.; "Secure Spread Spectrum Watermarking for Multimedia," NEC Research Institute, Technical Report 95-10.

Olligschlaeger, A. M., "Criminal Intelligence Databases and Applications", in Marilyn B. Peterson, Bob Morehouse, and Richard Wright, Intelligence 2000: Revising the Basic Elements—A Guide for Intelligence Professionals, 2000, a joint publication of IALEIA and LEIU, United States.

Tirkel, A., et al.; "Image Watermarking—A Spread Spectrum Application,".

Coherent Announces Industry's First Remote Management System for Echo Canceller, Business Wire, Mar. 3, 1997.

Newton's Telecom Dictionary, 18th Edition, Feb. 2002, p. 168, section "coding theory".

Supplementary European Search Report for EP Application No. EP 04 80 9530, Munich, Germany, completed on Mar. 25, 2009.

International Search Report for International Application No. PCT/US04/025029, European Patent Office, Netherlands, mailed on Mar. 14, 2006.

Office Action mailed Dec. 1, 2011, in Canadian Patent Application No. 2,534,767, DSI-ITI, LLC, filed Aug. 4, 2004.

Final Office Action, mailed Jun. 1, 2011, in U.S. Appl. No. 11/819,834, filed Jun. 29, 2007, 26 pages.

Non-Final Office Action, mailed Sep. 22, 2010, in U.S. Appl. No. 11/819,834, filed Jun. 29, 2007, 26 pages.

Final Office Action, mailed Nov. 28, 2011, in U.S. Appl. No. 12/032,200, filed Feb. 15, 2008, 26 pages.

Non-Final Office Action, mailed May 3, 2011, in U.S. Appl. No. 12/032,200, filed Feb. 15, 2008, 27 pages.

* cited by examiner

_US 8,542,802 B2_

SYSTEM AND METHOD FOR THREE-WAY CALL DETECTION

CROSS-REFERENCE TO RELATED APPLICATIONS

This application is related to U.S. provisional application no. 60/901,342, filed 15 Feb. 2007, which is hereby incorporated by reference as though fully set forth herein.

BACKGROUND OF THE INVENTION a. Field of the Invention

This invention relates generally to telephony, and more particularly to a method and system for detecting each time a party is added to a previously recorded or live telephone call.

b. Background Art

There is a general need for systems that detect three way calls. Many types of systems exist that detect three way calls by measuring certain line characteristics such as voltage fluctuations, noise and other electromechanical characteristics.

The purpose of many conventional three way call detection systems is to automatically disconnect an existing telephone connection whenever a three way call is detected. For example, correctional facilities such as jails and prisons routinely monitor or record telephone conversations of inmates. Inmates in general are prohibited from making three way telephone calls because these calls have been found to be made in order to, for instance, inappropriately contact witnesses or to call individuals that they would otherwise be prohibited from calling, such as convicted felons, drug dealers and gang members.

Although most correctional facilities record all telephone calls made by inmates, it is believed that on average only a very small proportion is ever monitored by correctional officers. Many correctional facilities record 2,000 inmate telephone calls a day, so monitoring all telephone calls or even a large fraction on a regular basis would require too much personnel and would be cost prohibitive. Inmates are aware of this and know that there is little chance of getting caught making a three way call. Thus, many make three way calls on a routine basis without being detected.

It is desirable in some instances to allow the completion of three way calls for intelligence gathering purposes because such calls often contain evidence of wrongdoing, such as terrorist or criminal activity, or other valuable information. Simply disconnecting an inmate as soon as a three way call is detected could result in the loss of potentially valuable information in those cases where an inmate is suspected of using telephones to engage in illegal or improper activity.

BRIEF SUMMARY OF THE INVENTION

It is therefore desirable to be able to search for and retrieve telephone calls that involved three way conversations in order to determine whether illegal activities were discussed.

It is also desirable to be able to go directly to the point in the conversation where the three way call took place without having to listen to the entire conversation.

The present invention provides a method and system for the detection, retrieval and playback of three way telephone calls based upon an analysis of the characteristics and patterns of the content of the telephone conversation. The invention is designed to provide an efficient means for organizations such as correctional facilities to identify and monitor the contents of three way conversations. The present invention leverages the discovery that three way conversations share a number of characteristics that can readily be detected, measured, analyzed, and input into computer algorithms which can then reliably determine whether a three way call was placed during a particular telephone conversation.

Disclosed herein is a system for detecting three-way calls in a monitored telephone conversation. The system includes a speech recognition processor that transcribes the monitored telephone conversation and associates at least one characteristic of the monitored telephone conversation with a transcript of the monitored telephone conversation. A database stores at least the transcript of the monitored telephone conversation and the at least one characteristic associated therewith. In some embodiments of the invention, the database also stores a recording of the monitored telephone conversation. A three-way call detection processor analyzes the at least one characteristic associated with the monitored telephone conversation to detect the addition of one or more third parties to the monitored telephone conversation.

The system preferably includes at least one domain-specific language model, such as a language model specific to inmate telephony, that the speech recognition processor utilizes to transcribe the monitored telephone conversation. The system may include multiple domain-specific language models trained for a plurality of ethnic groups, dialects, foreign languages, or other variations in speech and language patterns. Where foreign languages are involved, an optional translation processor may be utilized to translate the monitored telephone conversation or the transcript thereof.

In some embodiments of the invention, transcription and extraction of characteristics occurs in real-time (that is, while the monitored telephone conversation is in progress). Alternatively, the telephone conversations may be recorded and processed at a later time.

At least some of the characteristics extracted from the monitored telephone conversation are indicative of the addition of a third-party to the conversation, and thus of the establishment of a three-way call. For example, gaps in conversation, dial tones, dial pulses, ring tones, telephone salutations ("hello"), and other verbal and non-verbal cues or patterns may indicate that a third party has joined the conversation. The three-way call detection processor may detect these characteristics using any of a number of call-processing algorithms, including, without limitation: algorithms that measure the frequency of phrases uttered during the conversation; algorithms that measure the timing of phrases uttered during the conversation; algorithms that extract entities from phrases uttered during the conversation; pattern detection algorithms that compare timings of utterances within the conversation with timings of the at least one characteristic associated therewith; and any combinations thereof.

Based upon the characteristics and patterns of the monitored telephone conversation, a score may be assigned that is indicative of a likelihood that at least one third party was added to the monitored telephone conversation.

The present invention also provides a method of detecting three-way calls in a monitored telephone conversation. The method includes: transcribing the monitored telephone conversation; extracting a plurality of characteristics of the monitored telephone conversation; associating the extracted plurality of characteristics with a transcript of the monitored telephone conversation; utilizing a scoring algorithm to assign a score to the monitored telephone conversation based on the extracted plurality of characteristics, wherein the score is indicative of a likelihood that at least one third party was added to the monitored telephone conversation; and generating information regarding addition of a third party to the monitored telephone conversation. The scoring algorithm typically utilizes a scoring function, such as a logistic function or a threshold function, to calculate the score, but may also utilize an artificial neural network.

The information generated by the method may include tagging the transcript to identify portions thereof that are pertinent to the addition of the third party. In other embodiments of the invention, the information generated includes timestamps or word or character locations at which the three-way call likely begins. Of course, the transcript may also be associated with a sound recording of the monitored telephone conversation.

In another aspect of the invention, a method of detecting three-way calls in a monitored telephone conversation, includes the following steps: transcribing the monitored telephone conversation; extracting a plurality of characteristics of the monitored telephone conversation, wherein the plurality of characteristics extracted are indicators of a third party being added to the monitored telephone conversation; calculating a score for the monitored telephone conversation based upon at least two of the plurality of characteristics extracted from the monitored telephone conversation, wherein the score is indicative of a likelihood that at least one third party was added to the monitored telephone conversation; and generating information regarding addition of a third party to the monitored telephone conversation. Preferably, at least three of the plurality of characteristics, and more preferably at least four of the plurality of characteristics, will be used to calculate the score for the monitored telephone conversation.

Also disclosed herein is a query and retrieval system for monitored telephone conversations. The query and retrieval system includes a database of monitored telephone conversations including a plurality of call records. At least some of the call records include a recording of the monitored telephone conversation, a transcript of the monitored telephone conversation, and a score assigned to the monitored telephone conversation. The score reflects a likelihood or probability that the monitored telephone conversation included one or more three-way calls, and is based upon one or more characteristics or patterns of the monitored telephone conversation indicative of adding a third party thereto. The system also includes a query interface that accepts user input of search criteria, including at least a score criterion; a processor that retrieves one or more call records from the database based upon the search criteria; a selection interface that permits user selection of a call record from the retrieved one or more call records; and an output device that provides synchronized playback and visualization, respectively, of the recording and transcript included in the selected call record. The output device optionally provides a visual identification of the one or more characteristics of the monitored telephone conversation indicative of adding a third party thereto. In some embodiments of the invention, the system further includes an interface that permits direct navigation to one or more three-way calls within the monitored telephone conversation.

An advantage of the present invention is that it operates independently of any particular type of telephone system, such as VOIP or POTS.

Another advantage of the present invention is that it is not necessary to modify existing telephone equipment or add hardware devices.

Still another advantage of the present invention is that it can detect three way calls more accurately than previous methods.

Yet another advantage of the present invention is that it can provide detailed information as to the nature and content of the three way call.

Another advantage of the present invention is that it permits one to "jump" directly to the point in the conversation where the three-way call likely occurred.

Still another advantage is that the present system permits the review of a large number of recorded phone calls using only a small number of personnel.

A further advantage of the present invention is that it permits the collection of intelligence information to help uncover inappropriate activities, such as acts of terrorism.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
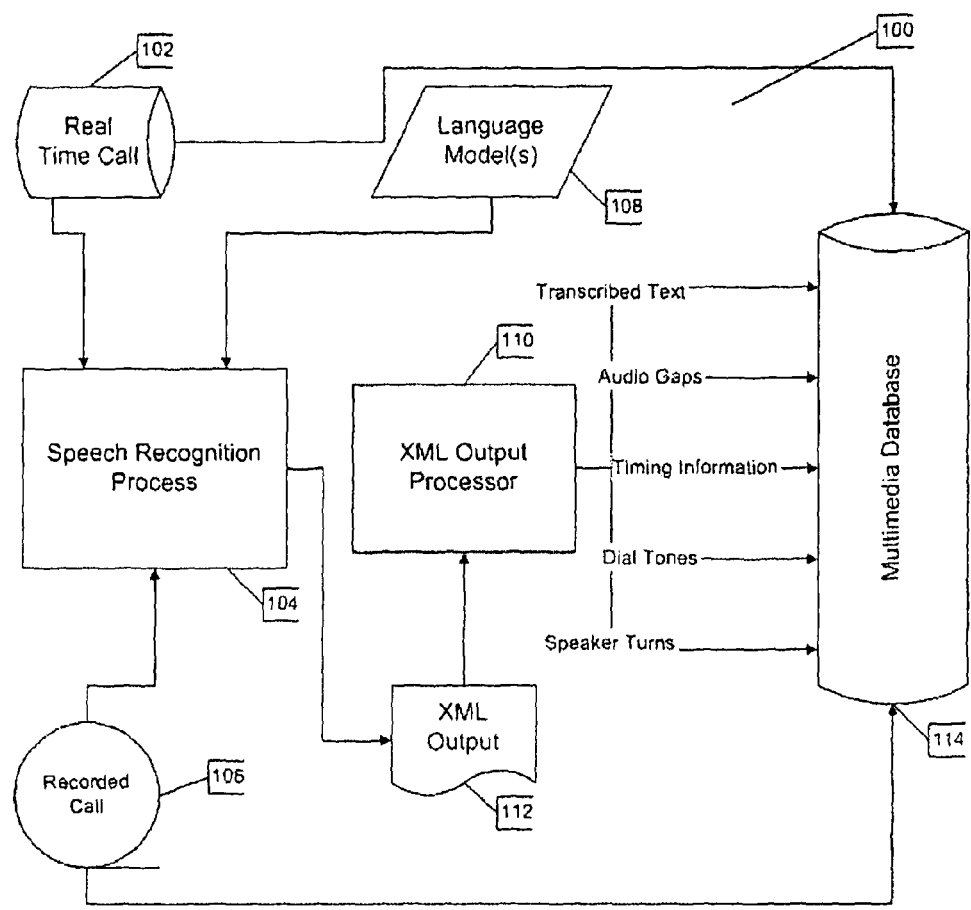
FIG. 1 is a block diagram illustrating a speech recognition system according to an embodiment of the present invention.

The following description illustrates the invention with reference to a real world domain, and in particular with respect to correctional facilities. However, it should be understood that the practice of the invention is not limited to any particular domain or application. Rather, it is intended to be more generally applicable to any domain where there is a need for three way call detection by examining the contents and call characteristics of recorded or live telephone conversations.

Unlike traditional three-way call detection systems, the primary purpose of which is to terminate a telephone conversation upon establishment of a three-way call, the present invention identifies the three-way call and allows the call to proceed. A user of the system, such as a corrections officer or investigator, may then search for monitored calls during which at least one three-way call took place, retrieve such a call, and proceed directly to the point where a third party was added, for example to gather intelligence or evidence of inappropriate conduct.

The following is a portrayal of one example of a typical sequence of events that might occur when an inmate or similar person makes a three way call:

1. The inmate first places a call to a telephone number that is not blocked or otherwise restricted by the correctional facility. The recipient of the call answers the phone.

2. At some point during the telephone conversation, the inmate asks the recipient to place a three way call. When making this request, the inmate might dictate a telephone number or mention the name or organization of the third party to call.

3. The recipient then might put the inmate on hold while the call is being made. Alternatively, the recipient might use a separate phone (e.g., a separate cell phone) to place the three way call. Certain call characteristics suggestive of a three-way call, such as a gap in speech or a series of dial tones or pulses, may be observed, and may possibly be followed by a ring tone.

4. The third party answers the phone and commences conversing with the inmate. The third party will typically answer with a phrase commonly used when answering the telephone such as "hello," "hi," or another salutation or greeting, or stating the name of a person or organization. At this point a speaker recognition (or speaker turn) component of the speech recognition system may detect that a third and previously undetected speaker has been added to the call. It is important to note that the addition of a third and previously undetected speaker in the conversation by itself is not dispositive of a three way call. It could simply be another member of the household of the original recipient of the call.

5. After a while the inmate or three way call recipient decides to terminate the three way call. At this point the inmate may do one of three things: terminate the original call, continue to converse with the original recipient, or make another three way call.

6. If another three way call is made, then the same or similar sequence of events from (1) through (5) applies.

The present invention focuses on and analyzes the three way call characteristics described above (e.g., verbal and non-verbal cues, such as telephone numbers, names of people or organizations to call, salutations, dial tones, dial pulses, ring tones, gaps in conversation, speaker turns/recognition of new speakers, and other three way call characteristics). A speech recognition processor, in combination with a plurality of other algorithms and processors, searches the monitored call for clues that would indicate the addition of one or more third parties to a telephone conversation, while a three-way call detection processor evaluates the clues to determine a probability that the call included at least one three-way call.

FIG. 1 illustrates a block diagram of a speech recognition system 100 according to an embodiment of the present invention. The speech recognition system 100 may be software-implemented (e.g., a software program executed by one or more computer systems or speech recognition processors), hardware-implemented (e.g., as a series of instructions stored in one or more solid-state devices), or a combination of both. It should also be understood that multiple instances of the speech recognition system 100 may be simultaneously executed on a single computer or on multiple computers.

In FIG. 1, the speech recognition process 104 processes previously recorded telephone conversations 106 or ongoing telephone conversations 102, which are referred to interchangeably herein as "monitored telephone conversations," "telephone conversations," "conversations," or simply "calls." The speech recognition process 104 performs a number of functions, of which one is converting the spoken audio to text (transcription). In doing so, the speech recognition process utilizes at least one language model 108. When transcribing speech to text, it is desirable to ensure that the language model used is domain-specific, which enhances the accuracy of the transcription process. A "domain-specific" language model is a language model that accurately reflects the linguistic nuances of the participants of a telephone conversation, for example a language model that is domain-specific to inmate telephony. Preferably, therefore, at least one domain specific language model is used by the system in transcribing the audio of the monitored telephone conversation to text.

In some embodiments of the invention, it is contemplated that multiple domain-specific language models may be used, which may be trained for a plurality of ethnic groups, a plurality of regional dialects, or other language differences. Using multiple domain-specific language models has been shown to significantly improve speech recognition and transcription accuracy. It is also contemplated that, in instances where foreign languages are spoken, multiple domain-specific language models trained for a plurality of foreign languages may be used. Further, a translation processor may be utilized to translate the transcript of the monitored telephone conversation from a first language to a second language (e.g., to translate a conversation in Spanish into English).

In addition to converting spoken audio to text, the speech recognition process extracts a number of verbal and non-verbal characteristics from the telephone conversation. These include, but are not limited to, speaker turns (e.g., as determined by voice-recognition of the speakers in the telephone conversation); gaps in audio; dial, pulse, and ring tones; verbal cues (e.g., mentions of telephone numbers, mentions of people or organizations to call, or telephone salutations such as "hello"); speech and phraseology patterns; and timing information that includes the beginning and end times (e.g., as measured in either seconds or milliseconds from the beginning of the telephone conversation) of utterances, audio gaps, dial, pulse and ring tones, and speaker turns. The characteristics are preferably associated with the transcript of the monitored telephone conversation.

Once the speech recognition process has completed processing the telephone conversation, it outputs the results to a file. One suitable format for the output file is an XML file 112. The output file is then processed by an output processor 110 that extracts each component from the XML file and inserts it as a call record into a multimedia database 114, for example as a binary large object (BLOB). That is, as illustrated in FIG. 1, the multimedia database stores the transcript of the monitored telephone conversation, the associated characteristics of the monitored telephone conversation, and, in some embodiments of the invention, a sound recording of the monitored telephone conversation. The sound recording may, of course, be analog or digital. It is also within the spirit and scope of the present invention to store the recordings of the monitored telephone conversation in a file system external to the multimedia database, in which case the multimedia database preferably includes appropriate references to the external file system. The telephone conversation is now ready for three way call detection.

Figure 2:
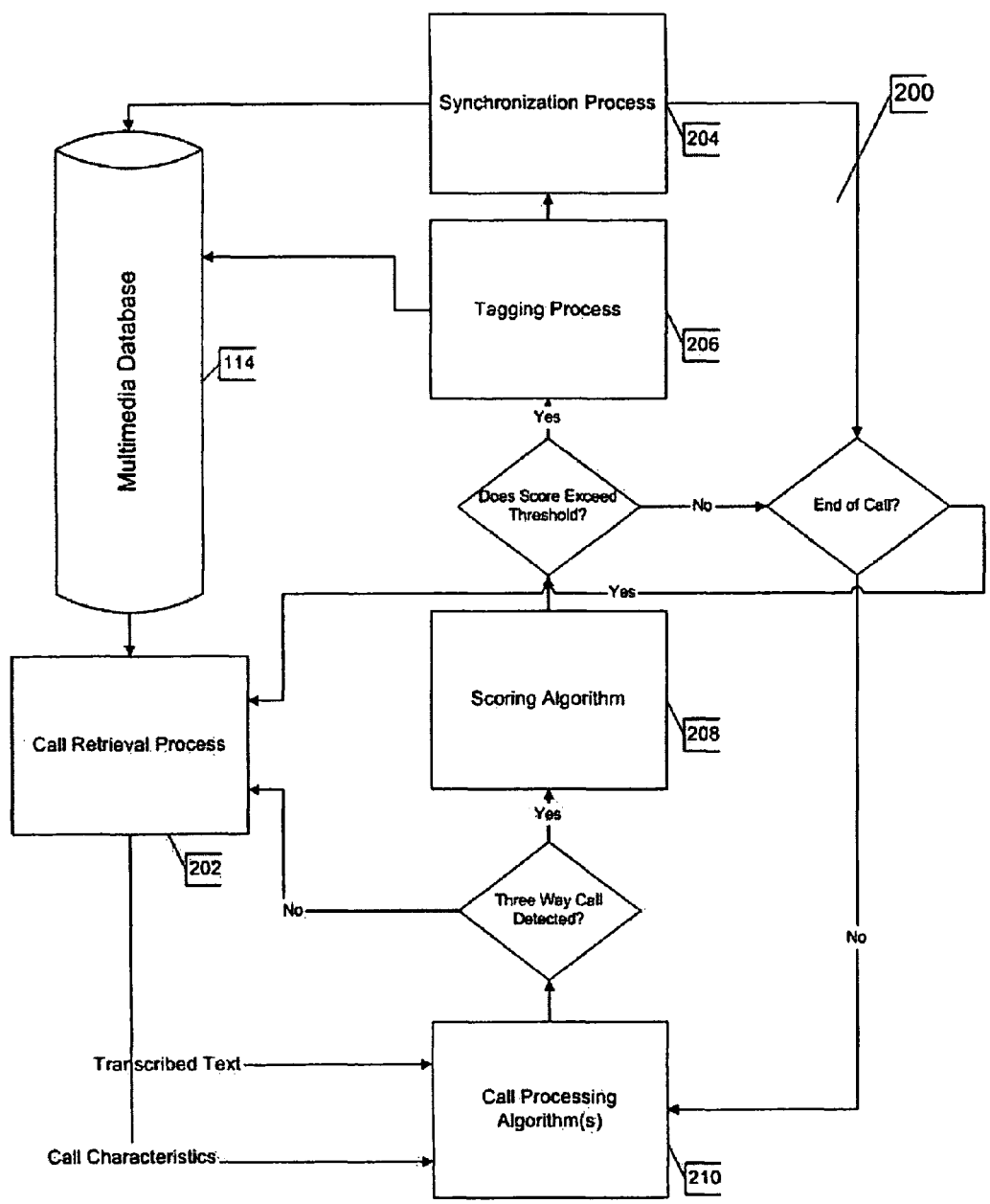
FIG. 2 is a flow diagram illustrating a three way call detection method according to an embodiment of the present invention.

FIG. 2 illustrates a flow chart diagram of a three way call detection method 200 according to an embodiment of the present invention. As with the speech recognition method illustrated in FIG. 1 and described above, it is contemplated that the three-way call detection method illustrated in FIG. 2 and described below may be hardware-implemented, software-implemented, or both hardware- and software-implemented. It is also contemplated that multiple instances of the three-way call detection method may run simultaneously on one or more computers or by one or more three-way call detection processors.

In the embodiment illustrated in FIG. 2, the three way call detection method begins by utilizing a call retrieval process 202 to retrieve a previously unprocessed call from the multimedia database 114. The transcribed text, as well as information regarding the associated call characteristics, may be forwarded to the call processing algorithms 210. The call processing algorithms employ a variety of techniques including, but not limited to: entity extraction (e.g., algorithms that extract people, places, organizations, telephone numbers and other entities from the transcribed text); algorithms that measure the frequency of phrases uttered during the call; algorithms that measure the timing of phrases uttered during the call; pattern detection techniques that compare the timing of phrases and entities uttered with the timing of extracted telephone conversation characteristics such as gaps in speech, dial tones, pulses and speaker turns; and any combinations thereof. For example, one call processing algorithm may compare the timing of the utterance of a telephone number with the timing of a gap in the conversation; if the two are close in time (e.g., a telephone number is uttered and, a few seconds later, a gap in the conversation occurs), it may indicate establishment of a three-way call.

The call processing algorithms seek characteristics or patterns indicative of a three-way call. If any characteristics or patterns indicative of a three-way call are identified at a particular point in the telephone conversation, the call processing algorithms may output a matrix of the identified characteristics and/or patterns, along with timing information and a weighting structure that weights each pattern and characteristic with respect to its relative importance as a characteristic or pattern indicative of a three-way call. For example, a gap in the conversation may have a lower weight than an utterance of a telephone number followed by a gap in the conversation, which may have a lower weight than an utterance of a telephone number followed by a gap in the conversation in which dial tones are detected, which may have a lower weight than an utterance of a telephone number followed by a gap in the conversation in which dial tones are detected and after which a new speaker is identified by the speech recognition processor. The output matrix is then forwarded to the scoring algorithm 208. If no three way call characteristics are identified, control is returned to the call retrieval process, which then retrieves the next unprocessed telephone conversation from the multimedia database.

The scoring algorithm 208 then computes a score based on the output matrix of the extracted call characteristics and patterns. The score is indicative of a likelihood or probability that at least one third party was added to the monitored telephone conversation. In some embodiments of the invention, the score is computed as follows:

$$S = \sum_{i=1}^{n} w_i x_i,$$

where S is the interim score, n is the number of characteristics and patterns in the output matrix of the call processing algorithms 210, $w_i$ is the weight of the $i^{th}$ characteristic or pattern in the matrix, and $x_i$ is the $i^{th}$ characteristic or pattern in the matrix. Note that $x_i$ can be represented by binary, integer, or continuous values. In other embodiments of the invention, the scoring algorithm may calculate the value of S using an associative artificial neural network, such as an associative network, for example Kohonen networks.

Figure 3:
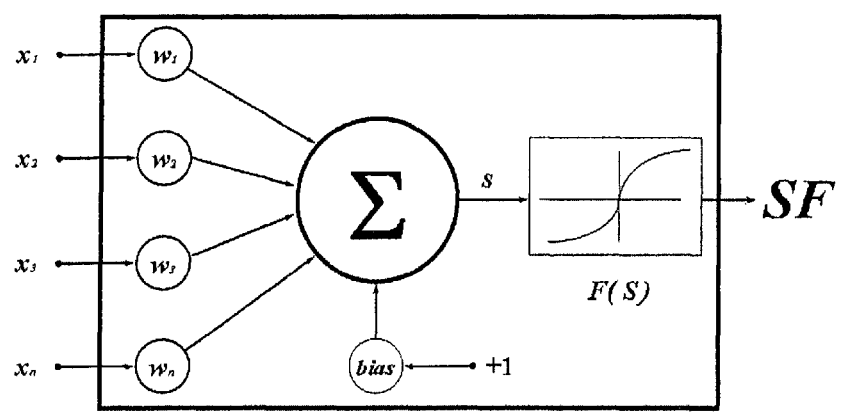
FIG. 3 is a drawing illustrating a scoring algorithm according to an embodiment of the present invention.

The interim score S may optionally be further refined by the use of a logistic function to produce values of between zero and one as follows:

$$SF = \frac{1}{1 + e^{-S}},$$

where SF is the final score. A graphical representation of the two scoring equations outlined above is illustrated in FIG. 3, where F(S) is represented by the preceding equation. Also in FIG. 3, a bias is added to the calculation of S. If the interim score S is not further refined, then the interim score S becomes the final score SF.

Referring once again to FIG. 2, after the final score has been calculated, it is determined whether it exceeds a minimum requirement to indicate that a three way call took place. For example, the final score may be compared to a threshold in order to minimize the potential for false positives (e.g., identifications of three-way calls where no three-way calls in fact occurred). If the threshold is exceeded, control is passed to the tagging algorithm 206, which will be further described below. Otherwise, if the end of the current call has been reached, control is passed back to the call retrieval process 202. If the end of the call has not been reached, control is passed back to the call processing algorithms 210, which will then continue processing the call.

Upon successful detection of a three way call, information regarding the addition of a third party to the telephone conversation may be generated. For example, the tagging process 206 may tag the telephone conversation being processed as including at least one three-way call, and may also tag each phrase, pattern, or point in the transcript that is pertinent to a three way call. The tags may then be added to the multimedia database 114 as part of the call record along with the final score for the telephone conversation output by the scoring algorithm.

The tagging process 206 then passes control to the synchronization process 204. The synchronization process identifies the likely beginning of the detected three way call and updates the call record produced by the tagging process 206 with information regarding the likely beginning of the detected three-way call. For example, the synchronization process 204 may add a time stamp or other timing information that identifies the number of seconds from the beginning of the call at which the three-way call took place. The synchronization process 204 may also add information about how many words or characters into the transcript the three way call occurred. The multimedia database 114 may also be updated to include at least one index of detected three-way calls and the characteristics associated with those calls.

If the end of the call has been reached, control is returned to the call retrieval process. Otherwise, control is returned to the call processing algorithms.

Figure 4:
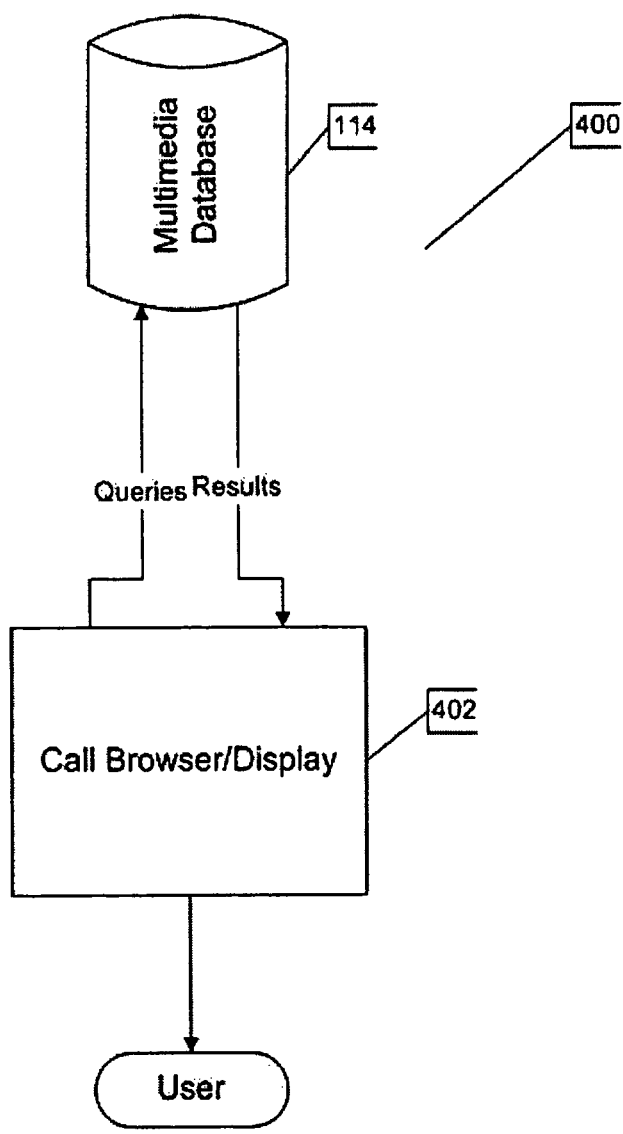
FIG. 4 is a block diagram illustrating a query and retrieval system according to an embodiment of the present invention.

FIG. 4 is a block diagram of a generalized query and retrieval system 400 according to an embodiment of the present invention that may be used to retrieve records from the multimedia database 114, and in particular may be used to retrieve records of three-way calls from the multimedia database 114. The call browser and display 402 of FIG. 4 may be used to query and retrieve detected three way calls from the multimedia database 114. The call browser and display 402 preferably accepts queries based upon scores. For example, a user may request calls having scores that fall within a particular range or that exceed a particular threshold. It is contemplated, however, that the call browser and display 402 may accept any type of criteria on which to search the multimedia database 114 (e.g., call dates, call times, or the identity of a party to the call). A suitably-programmed processor may retrieve one or more call records meeting the specified criteria from the multimedia database 114.

Figure 5:
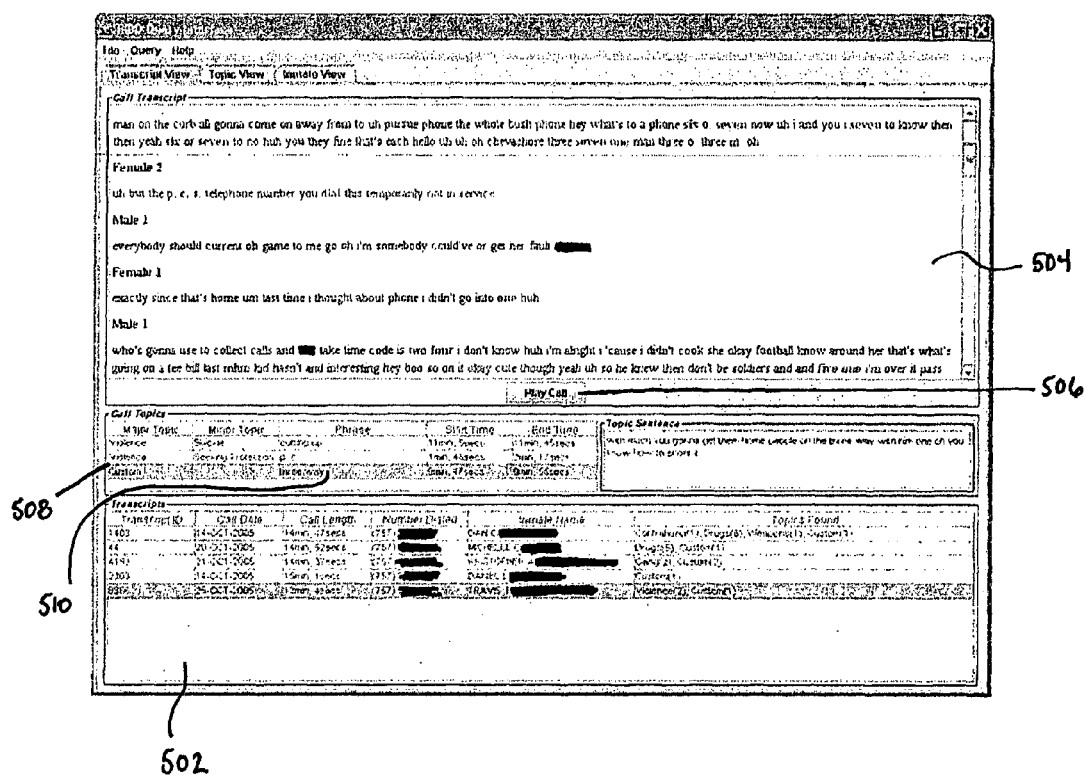
FIG. 5 is a sample output screen according to an embodiment of the query and retrieval system of the present invention.

FIG. 5 shows a sample output screen 500 of a query and retrieval system according to the present invention. Panel 502 displays the call records retrieved in response to a particular query and permits a user to select one of the retrieved call records. Panel 504 shows the transcript of the selected call record. The "Play Call" button 506 will initiate playback of the recording of the selected telephone conversation. Preferably, the query and retrieval system includes an output device capable of providing synchronized playback and visualization, respectively, of the recording and transcript of the selected telephone conversation. For example, as the audio recording of the call is played back, a moving highlight may track through the transcript in panel 504.

The output device further preferably provides a visual identification of the one or more characteristics of the monitored telephone conversation that are indicative of the establishment of a three-way call. For example, the transcript in panel 504 may be highlighted or otherwise flagged at the point where the three-way call was established or throughout the three-way call (e.g., the entire portion of the transcript covering the three-way call may be bold faced). Similarly, the panel 508 may show a time stamp 510 of when in the call the three-way call was established, and, optionally, when it was terminated. In some embodiments of the invention, the time stamp 510 may be used to navigate directly (or "jump") to the point in the conversation where the three-way call took place, thereby advantageously permitting law enforcement officials to review only the portion of the conversation that is of particular interest.

Although only a few illustrative embodiments of this invention have been described above with a certain degree of particularity, those skilled in the art could make numerous alterations to the disclosed embodiments without departing from the spirit or scope of this invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for detecting three-way calls in a monitored telephone conversation, the system comprising:
   a speech recognition processor that transcribes the monitored telephone conversation and associates at least two characteristics of the monitored telephone conversation with a transcript of the monitored telephone conversation;
   a database that stores at least the transcript of the monitored telephone conversation and the at least two characteristics associated therewith; and
   a three-way call detection processor that analyzes the at least two characteristics associated with the transcript of the monitored telephone conversation to detect the addition of one or more third parties to the monitored telephone conversation, wherein the at least one characteristic includes at least one network characteristic and one speech characteristic.

2. The system according to claim 1, further comprising at least one domain-specific language model, and wherein the speech recognition processor utilizes the domain-specific language model to transcribe the monitored telephone conversation.

3. The system according to claim 2, wherein the at least one domain-specific language model is domain specific to inmate telephony.

4. The system according to claim 2, wherein the at least one domain-specific language model comprises a plurality of domain-specific language models trained for a plurality of ethnic groups.

5. The system according to claim 2, wherein the at least one domain-specific language model comprises a plurality of domain-specific language models trained for a plurality of regional dialects.

6. The system according to claim 2, wherein the at least one domain-specific language model comprises a plurality of domain-specific language models trained for a plurality of foreign languages.

7. The system according to claim 1, wherein the database further stores a sound recording of the monitored telephone conversation.

8. The system according to claim 1, wherein the speech recognition processor transcribes the monitored telephone conversation and associates the at least two characteristics with the transcript of the monitored telephone conversation in real-time.

9. The system according to claim 1, wherein the speech recognition processor comprises a solid-state device.

10. The system according to claim 1, wherein the at least one network characteristic is selected from the group consisting of: dial tones; dial pulses; ring tones; and the at least one speech characteristic is selected from the group consisting of gaps in conversation; speaker turns; telephone salutations, and verbal cues.

11. The system according to claim 1, further comprising a translation processor to translate the transcript of one or more of the monitored telephone conversations from a first language into a second language.

12. The system according to claim 1, wherein the three-way call detection processor assigns a score to the monitored telephone conversation based on the at least two characteristics associated with the transcript thereof, wherein the score is indicative of a likelihood that at least one third party was added to the monitored telephone conversation.

13. The system according to claim 1, wherein the three-way call detection processor utilizes one or more call-processing algorithms to detect the addition of one or more third parties to the monitored telephone conversation, wherein the one or more call-processing algorithms are selected from the group consisting of: algorithms that measure frequency of phrases uttered during the monitored telephone conversation; algorithms that measure timing of phrases uttered during the monitored telephone conversation; algorithms that extract entities from phrases uttered during the monitored telephone conversation; pattern detection algorithms that compare timings of utterances within the monitored telephone conversation with timings of the at least one characteristic associated therewith; and any combinations thereof.

14. A method of detecting three-way calls in a monitored telephone conversation, comprising:
    transcribing the monitored telephone conversation;
    extracting a plurality of characteristics of the monitored telephone conversation;
    associating the extracted plurality of characteristics with a transcript of the monitored telephone conversation;
    utilizing a scoring algorithm to assign a score to the monitored telephone conversation based on the extracted plurality of characteristics, wherein the score is indicative of a likelihood that at least one third party was added to the monitored telephone conversation, wherein the plurality of characteristics includes at least one network characteristic and one speech characteristic; and
    generating information regarding addition of a third party to the monitored telephone conversation.

15. The method according to claim 14, wherein the step of utilizing a scoring algorithm to assign a score to the monitored telephone conversation comprises: identifying one or more characteristics indicative of addition of a third party to the monitored telephone conversation within the extracted plurality of characteristics; and utilizing a scoring function to calculate the score based upon the identified one or more characteristics indicative of addition of a third party.

16. The method according to claim 15, wherein the scoring function comprises a logistic function.

17. The method according to claim 15, wherein the scoring function comprises a threshold function.

18. The method according to claim 14, wherein the step of generating information regarding addition of a third party to the monitored telephone conversation comprises tagging the transcript of the monitored telephone conversation to identify portions of the transcript pertinent to addition of the third party.

19. The method according to claim 14, wherein the step of generating information regarding addition of a third party to the monitored telephone conversation comprises:
  identifying likely beginnings of one or more detected three-way calls in the monitored telephone conversation; and
  associating information regarding the identified likely beginnings of the one or more detected three-way calls with one or more of the monitored telephone conversation and the transcript of the monitored telephone conversation.

20. The method of claim 19, further comprising providing a sound recording of the monitored telephone conversation, wherein the information regarding the identified likely beginnings of the one or more detected three-way calls comprises one or more time points in the sound recording of the monitored telephone conversation where the one or more detected three-way calls begin.

21. The method of claim 19, wherein the information regarding the identified likely beginnings of the one or more detected three-way calls comprises one or more word- or character-lengths into the transcript of the monitored telephone conversation where the one or more detected three-way calls begin.

22. A method of detecting three-way calls in a monitored telephone conversation, comprising:
  transcribing the monitored telephone conversation;
  extracting a plurality of characteristics of the monitored telephone conversation, wherein the plurality of characteristics extracted are indicators of a third party being added to the monitored telephone conversation;
  calculating a score for the monitored telephone conversation based upon at least two of the plurality of characteristics extracted from the monitored telephone conversation, wherein the score is indicative of a likelihood that at least one third party was added to the monitored telephone conversation, wherein the plurality of characteristics includes at least one network characteristic and one speech characteristic; and
  generating information regarding addition of a third party to the monitored telephone conversation.

23. The method according to claim 22, wherein the step of calculating a score for the monitored telephone conversation based upon at least two of the plurality of characteristics extracted from the monitored telephone conversation comprises calculating a score for the monitored telephone conversation based upon at least three of the plurality of characteristics extracted from the monitored telephone conversation.

24. The method according to claim 22, wherein the step of calculating a score for the monitored telephone conversation based upon at least two of the plurality of characteristics extracted from the monitored telephone conversation comprises calculating a score for the monitored telephone conversation based upon at least four of the plurality of characteristics extracted from the monitored telephone conversation.

25. A query and retrieval system for monitored telephone conversations, comprising:
  a database of monitored telephone conversations including a plurality of call records, wherein at least some of the call records comprise:
    a sound recording of the monitored telephone conversation;
    a transcript of the monitored telephone conversation; and
    a score assigned to the monitored telephone conversation, wherein the score assigned to the monitored telephone conversation reflects a likelihood that the monitored telephone conversation included one or more three-way calls, and wherein the score is based upon one or more characteristics of the monitored telephone conversation indicative of adding a third party thereto, wherein the one or more characteristics includes at least one network characteristic and one speech characteristic;
  an query interface that accepts search criteria input by a user, wherein the search criteria include at least a score criterion;
  a processor that retrieves one or more call records from the database based upon the search criteria;
  a selection interface that permits user selection of a call record from the retrieved one or more call records; and
  an output device that provides synchronized playback and visualization, respectively, of the recording and transcript comprising the selected call record.

26. The system according to claim 25, wherein the output device further provides a visual identification of the one or more characteristics of the monitored telephone conversation indicative of adding a third party thereto.

27. The system according to claim 25, further comprising an interface that permits direct navigation to one or more three-way calls within the monitored telephone conversation.

* * * * *